3,417,165
Patented Dec. 17, 1968

3,417,165
FLUOROKETONE HEMIKETAL ESTER PHOSPHATES AND PHOSPHONATES
Peter E. Newallis, Morris Plains, and Pasquale Lombardo, East Hanover, N.J., assignors to Allied Chemical Corporation, New York, N.Y., a corporation of New York
No Drawing. Filed June 24, 1965, Ser. No. 466,803
10 Claims. (Cl. 260—941)

This invention relates to production of novel phosphates and phosphonates derived from fluoroketone hemiketal haloesters, useful as active pesticidal toxicants.

Accordingly, one object of the invention is to provide novel chemical compounds in the form of fluoroketone hemiketal ester phosphates and phosphonates. Another object is the provision of novel fluoroketone hemiketal ester phosphates and phosphonates as compositions for application as pesticides.

In accordance with the above objects the present invention is directed to compounds of the general formula:

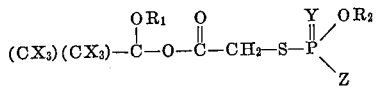

in which Y is a chalcogen selected from the group consisting of oxygen and sulfur, X is a halogen selected from the group consisting of chlorine and fluorine with the proviso that at least three of the X's are fluorine, $R_1$ and $R_2$ are alkyl radicals and Z is an alkyl or an alkoxy radical.

In the above formula, $R_1$ is a straight or branched chain alkyl radical, preferably containing from 1 to 12 carbon atoms. Alkyl groups representative of $R_1$ include alkyl radicals such as methyl, ethyl, n-propyl, isopropyl, n-butyl, t-butyl, n-hexyl, n-octyl, n-nonyl, n-decyl and n-dodecyl. Alkyl and alkoxy groups represented by $R_2$ and Z include methyl, methoxy, ethyl, ethoxy, n-propyl, n-propoxy, n-butyl, n-butoxy, n-hexyl, n-hexoxy and various isomeric forms thereof.

The fluoroketone hemiketal ester phosphates and phosphonates of the present invention are prepared by reaction of a phosphate or phosphonate of the general formula:

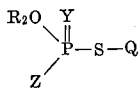

wherein Q is ammonium, an alkali metal such as sodium or potassium or an alkaline-earth metal such as barium or calcium and $R_2$, Y and Z have the afore-stated meaning with a haloacetone alkyl hemiketal haloacetate of the general formula:

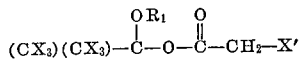

wherein X' is a halogen such as chlorine or bromine and X and $R_1$ have the afore-stated meaning. The reaction using α-chloro(1 - ethoxy - 1 - chlorodifluoromethyl)-2-chloro-2,2-difluoroethyl acetate and ammonium O,O-diethyl phosphorodithioate, for example, may be illustrated as follows:

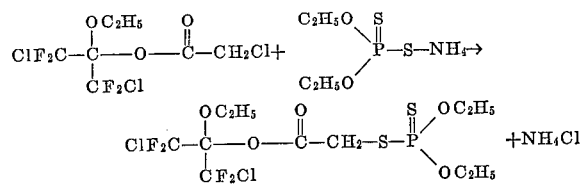

The haloacetone alkyl hemiketal haloacetate may be prepared by reacting a haloacetone alkyl hemiketal with a haloacetyl chloride in the presence of an inert solvent and a hydrogen halide acceptor such as pyridine as is described and claimed in our co-pending application Ser. No. 399,906, filed September 28, 1964 now U.S. Patent 3,362,986. This reaction may be represented by the following equation, in which $R_1$, X and X' have the above-stated meaning:

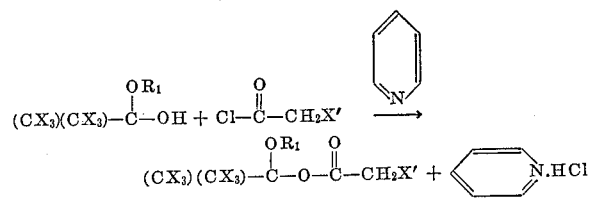

After completion of the reaction, the by-product salt, e.g., pyridine hydrochloride, is removed by filtration and the filtrate is distilled to remove the solvent. The resulting haloacetone alkyl hemiketal haloacetate may be further purified by distillation.

The fluoroketone hemiketal ester phosphates and phosphonates of the invention may be prepared by adding the above described phosphate or phosphonate compounds to a haloacetone alkyl hemiketal haloacetate with stirring in the presence of an inert organic solvent for one or both of the reactants at a temperature of about —20° C. to 100° C., preferably 0° C. to 40° C. Alternatively, the haloacetone alkyl hemiketal haloacetate may be added to the phosphate or phosphonate compound. After the reactants are mixed, the reaction mixture is held for about ½ to 48 hours at a temperature of about 25° C. Ammonium, alkali metal or alkaline-earth metal halide, formed during the reaction may be removed by any conventional procedure, preferably by filtration and the solvent may be removed by simple distillation at atmospheric or subatmospheric pressure. The fluoroketone hemiketal ester phosphate or phosphonate product is recovered as the distilland.

The inert organic solvent employable herein is preferably one lower boiling than the fluoroketone hemiketal ester phosphate or phosphonate product. Suitable organic solvents include ketones such as acetone and diethyl ketone; ethers such as dioxane, diisopropyl ether and di-n-propyl ether; hydrocarbons such as benzene, toluene and xylene; dimethylformamide and tetrahydrothiophene dioxide.

Although the haloacetone alkyl hemiketal haloacetate and phosphate or phosphonate may be charged in molar proportions of 1 mol of haloacetate to about 1 to 10 mols of phosphate or phosphonate, approximately equimolar proportions of the reactants are preferred.

The following examples are given for the purpose of illustrating the present invention but are not intended to be limiting on the scope thereof.

EXAMPLE I

A solution of α-chloro(1-ethoxy-1-chlorodifluoromethyl)-2-chloro-2,2-difluoroethyl acetate (10 grams) in 100 ml. of acetone was placed in a reaction vessel provided with a stirrer. A solution of ammonium, O,O-diethyl phosphorodithioate (7 grams) in 100 ml. of acetone was added to the vessel with stirring at room temperature. Although the reaction appeared to be complete within a 2 hour period, stirring of the reaction mixture was continued overnight (20 hours) and the ammonium chloride (1.8 grams) formed during the reaction was filtered off. The filtrate was stripped at subatmospheric pressure to yield an oil which was dissolved in methylene chloride and washed twice with water. The organic extract was dried over magnesium sulfate and stripped in vacuo. A yield of 13.5 grams (theory—14.6 grams) of a viscous, light brown oil constituting the following fluoroketone hemiketal ester phosphate compound, as determined by infrared analysis, was obtained:

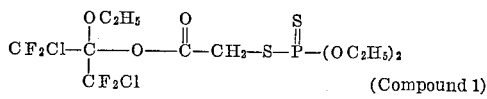
(Compound 1)

This compound was found to contain 5.96% phosphorus (theory—6.58%) and 12.4% sulfur (theory,—13.6%).

The haloacetone alkyl hemiketal haloacetate reactant was prepared in the following manner:

To a reaction vessel containing a solution of 147 grams of tetrafluorodichloroacetone ethyl hemiketal in 150 ml. of benzene was added 67.8 grams of chloroacetyl chloride dissolved in 50 ml. of benzene. A solution of 47.4 grams of pyridine in 50 ml. of benzene was then added slowly with stirring while cooling the reaction vessel with an ice bath. After completion of the addition, the mixture was heated overnight under reflux conditions. The reaction mixture was filtered to remove pyridine hydrochloride by-product and the filtrate was washed twice with water, dried over magnesium sulfate and distilled to remove the solvent. The resulting oil was distilled under vacuum to yield 66 grams of α-chloro(1-ethoxy-1-chlorodifluoromethyl)-2-chloro-2,2-difluoroethyl acetate.

EXAMPLE II

A solution of α-chloro(1-decoxy-1-chlorodifluoromethyl)-2-chloro-2,2-difluoroethyl acetate (10 grams) in 100 ml. of acetone was placed in a reaction vessel provided with a stirrer. To this reaction vessel at room temperature was added, with stirring, a solution of ammonium O,O-diethyl phosphorothioate (5 grams) in 100 ml. of acetone. Stirring of the reaction mixture was continued overnight and the ammonium chloride formed during the reaction was filtered off. The solvent was stripped under vacuum to yield an oil which was dissolved in methylene chloride and washed twice with water. The organic extract was dried over magnesium sulfate and stripped under vacuum. A yield of 11.5 grams of an amber oil constituting the following fluoroketone hemiketal ester phosphate compound, as determined by infrared analysis, was obtained:

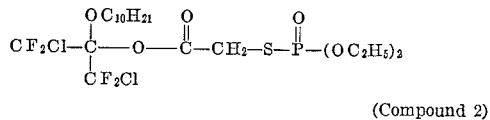
(Compound 2)

This compound was found to contain 5.54% phosphorus (theory—5.47%), 41.61% carbon (theory—40.3%) and 6.30% hydrogen (theory—5.87%).

The haloacetone alkyl hemiketal haloacetate reactant was prepared in the manner described in Example I by reaction of tetrafluorodichloroacetone n-decyl hemiketal with chloroacetyl chloride.

EXAMPLE III

A solution of α-chloro(1-ethoxy-1-trifluoromethyl)-2,2,2-trifluoroethyl acetate (5 grams) in 200 ml. of acetone was placed in a reaction vessel provided with a stirrer. A solution of ammonium O,O-dimethyl phosphorodithioate (3.5 grams) in 100 ml. of acetone was added to the vessel with stirring at room temperature. After allowing the reaction mixture to stir overnight at room temperature, the ammonium chloride formed during the reaction was filtered off. The filtrate was distilled under vacuum to remove the solvent, and the distilland was dissolved in methylene chloride and washed twice with water. The organic extract was dried over magnesium sulfate and stripped under vacuum. A yield of 6.5 grams of an amber oil constituting the following fluoroketone hemiketal ester phosphate compound, as determined by infrared analysis, was obtained:

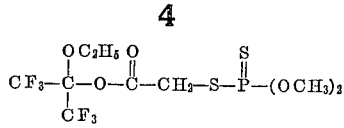
(Compound 3)

This compound was found to contain 7.21% phosphorus (theory—7.57%), 26.49% carbon (theory—26.4%) and 3.94% hydrogen (theory—3.20%).

The haloacetone alkyl hemiketal haloacetate reactant was prepared in the manner described in Example I by reaction of hexafluoroacetone ethyl hemiketal with chloroacetyl chloride.

EXAMPLE IV

A solution of ammonium O,O-diethyl phosphorodithioate (7.5 grams) in 100 ml. of acetone was placed in a reaction vessel provided with a stirrer. With stirring, 10.6 grams of α-chloro(1-isopropoxy-1-chlorodifluoromethyl)-2,2,2-trifluoroethyl acetate were added to the reaction vessel. The mixture was stirred at room temperature for 2 hours and the ammonium chloride formed was removed by filtration. The solvent was stripped from the filtrate on a steam bath at reduced pressure to yield an oil to which was added 50 grams of methylene chloride and 20 grams of water. The organic layer was separated and dried over sodium sulfate. A yield of 15 grams (theory—15.6 grams) of a light brown oil constituting the following fluoroketone hemiketal ester phosphate compound, as determined by infrared analysis, was obtained:

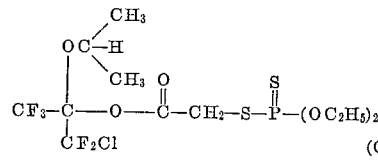
(Compound 4)

This compound was found to contain 14.0% sulfur (theory—13.7%).

The haloacetone alkyl hemiketal haloacetate reactant was prepared in the manner described in Example I by reaction of pentafluorochloroacetone isopropyl hemiketal with chloroacetyl chloride.

EXAMPLE V

A solution of ammonium O,O-diethyl phosphorodithioate (7.5 grams) in 100 ml. of acetone was placed in a reaction vessel provided with a stirrer. With stirring, 11.3 grams of α-chloro(1-ethoxy-1-fluorodichloromethyl)-2-chloro-2,2-difluoroethyl acetate were added to the reaction vessel. The mixture was stirred at room temperature for 2 hours and the ammonium chloride formed was removed by filtration. The solvent was stripped from the filtrate on a steam bath at reduced pressure to yield an oil to which was added 50 grams of methylene chloride and 20 grams of water. The organic layer was separated and dried over sodium sulfate. A yield of 14.5 grams (theory—16.2 grams) of a brown oil constituting the following fluoroketone hemiketal ester phosphate compound, as determined by infrared analysis, was obtained:

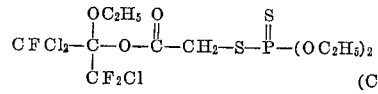
(Compound 5)

The haloacetone alkyl hemiketal haloacetate reactant was prepared in the manner described in Example I by reaction of trifluorotrichloroacetone ethyl hemiketal with chloroacetyl chloride.

EXAMPLE VI

A solution of ammonium O-ethyl, methyl phosphorodithioate (6.5 grams) in 100 ml. of acetone was placed in a reaction vessel provided with a stirrer. With stirring, 10.6 grams of α-chloro(1-ethoxy-1-trifluoromethyl)-2,2,2-trifluoroethyl acetate were added to the reaction vessel. The mixture was stirred at room temperature for 2 hours and the ammonium chloride formed was removed by filtration. The solvent was stripped from the filtrate on a steam bath at reduced pressure to yield an oil to which was added 50 grams of methylene chloride and 20 grams of water. The organic layer was separated and dried over sodium sulfate. A yield of 12 grams of a light brown oil constituting the following fluoroketone hemiketal ester phosphonate compound, as determined by infrared analysis, was obtained:

$$CF_3-\underset{\underset{CF_3}{|}}{C}-O-\overset{\overset{O}{\|}}{C}-CH_2-S-\overset{\overset{S}{\|}}{P}\begin{smallmatrix}CH_3\\OC_2H_5\end{smallmatrix}$$
(Compound 6)

This compound was found to contain 14.7% sulfur (theory—14.6%).

The haloacetone alkyl hemiketal haloacetate reactant was prepared in the manner described in Example I by reaction of hexafluoroacetone ethyl hemiketal with chloroacetyl chloride.

EXAMPLE VII

A solution of ammonium O-ethyl, methyl phosphorodithioate (6.5 grams) in 100 ml of acetone was placed in a reaction vessel provided with a stirrer. With stirring, 11.7 grams of α-chloro(1-ethoxy-1-chlorodifluoromethyl)-2-chloro-2,2-difluoroethyl acetate were added to the reaction vessel. The mixture was stirred at room temperature for 2 hours and the ammonium chloride formed was removed by filtration. The solvent was stripped from the filtrate on a steam bath at reduced pressure to yield an oil to which was added 50 grams of methylene chloride and 20 grams of water. The organic layer was separated and dried over sodium sulfate. A yield of 15 grams of a brown oil constituting the following fluoroketones hemiketal ester phosphonate compound, as determined by infrared analysis, was obtained:

$$CF_2Cl-\underset{\underset{CF_2Cl}{|}}{C}-O-\overset{\overset{O}{\|}}{C}-CH_2-S-\overset{\overset{S}{\|}}{P}\begin{smallmatrix}CH_3\\OC_2H_5\end{smallmatrix}$$
(Compound 7)

This compound was found to contain 13.8% sulfur (theory—13.6%).

The haloacetone alkyl hemiketal haloacetate reactant was prepared in the manner described in Example I by reaction of tetrafluorodichloroacetone ethyl hemiketal with chloroacetyl chloride.

In a manner analogous to that described in the above examples, other compounds illustrative of the present invention may be prepared as follows:

$$CF_3-\underset{\underset{CF_3}{|}}{C}-O-\overset{\overset{O}{\|}}{C}-CH_2-S-\overset{\overset{O}{\|}}{P}-(OC_2H_5)_2$$
(Compound 8)

by reaction of α-chloro(1-ethoxy-1-trifluoromethyl)-2,2,2-trifluoroethyl acetate with ammonium, O,O-diethyl phosphorothioate $$CF_2Cl-\underset{\underset{CF_2Cl}{|}}{\overset{\overset{OC{-}H(CH_3)_2}{|}}{C}}-O-\overset{\overset{O}{\|}}{C}-CH_2-S-\overset{\overset{O}{\|}}{P}-(OC_2H_5)_2$$
(Compound 9)

by reaction of α-chloro(1-isopropoxy-1-chlorodifluoromethyl)-2-chloro-2,2-difluoroethyl acetate with ammonium O,O-diethyl phosphorothioate.

$$CF_3-\underset{\underset{CFCl_2}{|}}{\overset{\overset{OCH_3}{|}}{C}}-O-\overset{\overset{O}{\|}}{C}-CH_2-S-\overset{\overset{O}{\|}}{P}-(OC_2H_5)_2$$
(Compound 10)

by reaction of α-chloro(1-methoxy-1-trifluoromethyl)-2-fluoro-2,2-dichloroethyl acetate with ammonium O,O-diethyl phosphorothioate.

$$CF_2Cl-\underset{\underset{CFCl_2}{|}}{\overset{\overset{OC_2H_5}{|}}{C}}-O-\overset{\overset{O}{\|}}{C}-CH_2-S-\overset{\overset{O}{\|}}{P}-(OC_2H_5)_2$$
(Compound 11)

by reaction of α-chloro(1-ethoxy-1-chlorodifluoromethyl)-2-fluoro-2,2-dichloroethyl acetate with ammonium O,O-diethyl phosphorothioate.

$$CF_3-\underset{\underset{CFCl}{|}}{\overset{\overset{OC_{12}H_{25}}{|}}{C}}-O-\overset{\overset{O}{\|}}{C}-CH_2-S-\overset{\overset{S}{\|}}{P}-(OCH_3)_2$$
(Compound 12)

by reaction of α-chloro(1-dodecoxy-1-trifluoromethyl)-2-fluoro-2,2-dichloroethyl acetate with ammonium O,O-dimethyl phosphorothioate.

$$CF_2Cl-\underset{\underset{CFCl_2}{|}}{\overset{\overset{OC_2H_5}{|}}{C}}-O-\overset{\overset{O}{\|}}{C}-CH_2-S-\overset{\overset{O}{\|}}{P}\begin{smallmatrix}OCH_3\\C_2H_5\end{smallmatrix}$$
(Compound 13)

by reaction of α-chloro(1-ethoxy-1-chlorodifluoromethyl)-2-fluoro-2,2-dichloroethyl acetate with ammonium O-methyl ethyl phosphonothioate.

$$CF_3-\underset{\underset{CFCl_2}{|}}{\overset{\overset{OC_4H_9}{|}}{C}}-O-\overset{\overset{O}{\|}}{C}-CH_2-S-\overset{\overset{S}{\|}}{P}\begin{smallmatrix}OC_2H_5\\C_2H_5\end{smallmatrix}$$
(Compound 14)

by reaction of α-chloro(1-butoxy-1-trifluoromethyl)-2-fluoro-2,2-dichloroethyl acetate with ammonium O-ethyl ethyl phosphonodithioate.

$$CF_2Cl-\underset{\underset{CF_3}{|}}{\overset{\overset{OC_{12}H_{25}}{|}}{C}}-O-\overset{\overset{O}{\|}}{C}-CH_2-S-\overset{\overset{O}{\|}}{P}\begin{smallmatrix}OC_2H_5\\CH_3\end{smallmatrix}$$
(Compound 15)

by reaction of α-chloro(1-dodecoxy-1-trifluoromethyl)-2-chloro-2,2-difluoroethyl acetate with ammonium O-ethyl methyl phosphonothioate.

$$CF_3-\underset{\underset{CF_3}{|}}{\overset{\overset{OCH_3}{|}}{C}}-O-\overset{\overset{O}{\|}}{C}-CH_2-S-\overset{\overset{O}{\|}}{P}\begin{smallmatrix}OC_2H_5\\CH_3\end{smallmatrix}$$
(Compound 16)

by reaction of α-chloro(1-methoxy-1-trifluoromethyl)-2,2,2-trifluoroethyl acetate with ammonium O-ethyl methyl phosphonothioate.

$$CF_2Cl-\underset{\underset{CF_2Cl}{|}}{\overset{\overset{OC_2H_5}{|}}{C}}-O-\overset{\overset{O}{\|}}{C}-CH_2-S-\overset{\overset{O}{\|}}{P}\begin{smallmatrix}OC_2H_5\\C_4H_9\end{smallmatrix}$$
(Compound 17)

by reaction of α-chloro(1-ethoxy-1-chlorodifluoromethyl)-2-chloro-2,2-difluoroethyl acetate with ammonium O-ethyl n-butyl phosphonothioate.

The compounds of this invention are useful as toxicants for combatting a wide variety of arthropod pests. It will be understood that the arthropods contemplated herein include not only those small invertebrate animals belonging mostly to the class Insecta, but also includes other allied classes of arthropods whose members usually have more than six legs, such as mites, ticks and spiders.

Although the compounds of the present invention are useful per se in combatting a wide variety of insect pests, it is preferred but not required that the compounds be supplied to the pests or to the environment of the pest or pests in conjunction with a major proportion of a carrier which may be a solid, liquid or gaseous material, the invention compounds constituting the toxic ingredient of such compositions. The toxicant compounds may be employed either in the form of liquid sprays or solid compositions and the amount of toxicant used in combatting the insect pests may vary considerably provided a sufficient quantity is used to provide the desired toxicity.

When employed in the form of a powder or dust for killing pests, the toxicant compounds may be mixed with a substantial portion of any suitable inert material or diluent, preferably in finely divided form, such as known grades of prepared paraciticide carrier clays, pyrophyllite, fuller's earth, bentonite, sulfur, lime, talc, whiting, diatomaceous earth, etc. Suitable dusts of this type for undiluted application usually contain not less than 0.1% and preferably not less than 1% by weight of toxicant. Other so-called water dispersible powder formulations usually contain not less than 15%, and preferably not less than 25% by weight, of the toxicant and are dispersed in water for application, sometimes by use of wetting and dispersing agents as is well known to the art.

Liquid pesticide sprays containing the toxicants of this invention may be utilized by applying the liquid compounds "as is" or by first forming a solution of the compound in a suitable organic solvent, e.g., xylene, methylated naphthalenes, acetone, hexane, dioxane, methyl ethyl ketone, solvent naphtha or any highly aromatic petroleum-type paraciticide oil, and preferably adding a small amount of emulsifying agent commonly employed in the art such as diglycol oleate, p-isooctyl phenyl ether of polyethylene glycol, sodium decylbenzene sulfonate and sodium dodecylbenzene sulfonate. The resulting concentrate solution may be applied "as is," diluted with more solvent or incorporated with water in quantity sufficient to form an aqueous dispersion or emulsion having the desired active ingredient concentration.

In a preferred embodiment, aqueous spray dispersions may be formed by incorporating in water dry mixtures or so-called wettable spray powders containing the toxicants of the invention. These mixtures may also include inert diluents, suitable quantities of wetting and dispersing agents and, if desired, secondary toxicants.

The aqueous spray dispersions of the invention preferably should contain the active ingredient in an amount not less than ⅛ of a pound per 100 gallons of spray, the more usual concentration being in the range of ¼ to ½ of a pound per 100 gallons of spray.

Many of the toxicant compounds of this invention are not only effective as contact toxicants but are also extremely toxic when used as systemic toxicants for killing pests which invade plants. In such use, the toxicant, with or without a suitable carrier or diluent, can be applied to soil in the vicinity of the growing plants to be protected, the toxicant being absorbed by the plants. Alternatively, the toxicant can be applied directly to portions of the plant where it is again absorbed and distributed throughout the plant tissue, including portions not directly treated. In either case, the whole plant then becomes toxic to pests which feed on it.

Following tables I and II contain the results of tests relating to use of a number of typical toxicant compounds of the invention as contact pesticides.

TABLE I

| Toxicant Compound | Formulation (parts by volume) | Mites [1] (percent kill) |
|---|---|---|
| 1 | 1 part toxicant composition [2] in 79 parts of water. | 95.7 |
| 4 | do | 100 |
| 5 | do | 100 |
| 7 | do | 79.2 |

[1] The mite tests were run on "Red spider" (Tetranychus telarius) by spraying the indicated formulation onto horticultural (cranberry) bean plants infested with the mites. Following treatment, the plants were stored on racks, on irrigated trays in a greenhouse. Observations on kill were made 3 days after treatment.
[2] 4.8 grams of toxicant compound dissolved in acetone to 100 cc.

TABLE II

| Toxicant Compound | Formulation | Houseflies [1] (percent kill) |
|---|---|---|
| 1 | Bait [2] containing 0.125% by weight of toxicant compound. | [3] 95.4 |
| 3 | do | [4] 95.7 |
| 4 | do | [4] 93.6 |
| 5 | do | [4] 100 |
| 6 | do | [5] 93.4 |
| 7 | do | [5] 100 |
| Check | | 0 |

[1] The tests on toxicity to houseflies (Musca domestica) were run by placing the formulations in emergence cages containing fly pupae. Cages containing bait untreated with the toxicant compound were used as checks. Examination of each cage was made after the indicated time to determine toxicity.
[2] The bait consists of powdered non-fat dry milk (44%), granulated sugar (44%) and powdered egg (12%).
[3] Percentage kill was recorded 8 days after confinement.
[4] Percentage kill was recorded 7 days after confinement.
[5] Percentage kill was recorded 9 days after confinement.

Following Table III illustrates systemic pesticide activity of some of the toxicant compounds coming within the scope of this invention. The tests were conducted by placing 100 cc. of the indicated formulation in a glass container along with the test plants (roots being washed free of soil). The plant foliage was infested with the pests 1 day later and mortality was noted 3 days after infestation.

TABLE III

| Toxicant Compound | Formulation (parts by volume) | Mites [1] (percent kill) | Pea aphids [2] (percent kill) |
|---|---|---|---|
| 2 | 1 part toxicant composition [3] in 159 parts distilled water. | 82.2 | 100 |
| 3 | do | 100 | 100 |
| 4 | do | 94.9 | 100 |
| 5 | do | 100 | 100 |
| 7 | do | | 100 |

[1] Test plants were horticultural (cranberry) bean plants.
[2] Test plants were English broad bean plants.
[3] 4.8 grams of toxicant compound dissolved in acetone to 100 cc.

From the foregoing, it is apparent that we have discovered a series of novel and valuable compounds possessing outstanding value as pesticides.

Since various changes and modifications may be made in the invention without departing from the spirit thereof, it is intended that all matter contained in the above description shall be interpreted as illustrative and not in a limiting sense.

We claim:

1. A compound of the formula:

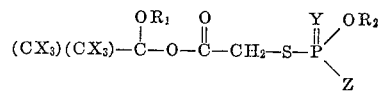

in which Y is a chalcogen selected from the group consisting of oxygen and sulfur, X is a halogen selected from the group consisting of chlorine and fluorine with the proviso that at least three of the X's are fluorine, $R_1$ is an alkyl radical having from 1 to 12 carbons, $R_2$ is an alkyl radical having from 1 to 6 carbons and Z is a member selected from the group consisting of alkyl and alkoxy having from 1 to 6 carbons.

2. A phosphate compound of the formula:

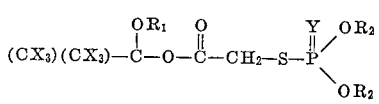

in which Y is a chalcogen having an atomic weight not greater than about 33, X is a halogen having an atomic weight not greater than about 36 with the proviso that at least three of the X's are halogen having an atomic weight not greater than about 19 and $R_1$ is an alkyl radical from 1 to 12 carbons, $R_2$ is an alkyl radical having from 1 to 6 carbons.

3. A phosphate compound having the formula:

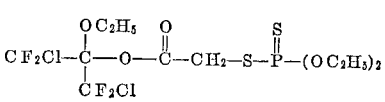

4. A phosphate compound having the formula:

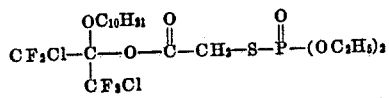

5. A phosphate compound having the formula:

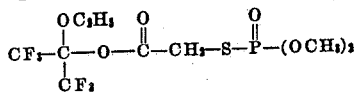

6. A phosphate compound having the formula:

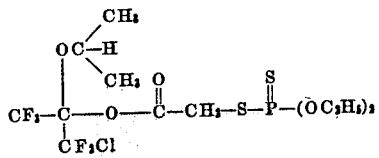

7. A phosphate compound having the formula:

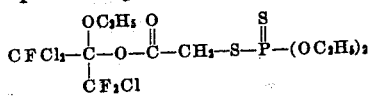

8. A phosphonate compound of the formula:

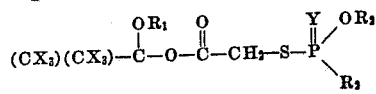

in which Y is a chalcogen having an atomic weight not greater than about 33, X is a halogen having an atomic weight not greater than about 36 with the proviso that at least three of the X's are halogen having an atomic weight not greater than about 19 and $R_1$ is an alkyl radical having from 1 to 12 carbons, and $R_2$ is an alkyl radical having from 1 to 6 carbons.

9. A phosphonate compound having the formula:

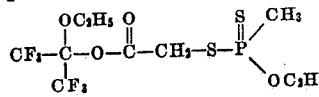

10. A phosphonate compound having the formula:

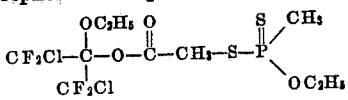

References Cited
UNITED STATES PATENTS

| | | | |
|---|---|---|---|
| 2,818,366 | 12/1957 | Birum | 107—22 |
| 2,906,661 | 9/1959 | Baker | 167—22 |
| 2,945,053 | 7/1960 | McConnell et al. | 260—941 |
| 3,020,304 | 2/1962 | Scherer | 260—461 |
| 3,059,014 | 10/1962 | Miller | 260—461 |
| 3,185,723 | 5/1965 | Floyd | 260—941 |

CHARLES B. PARKER, *Primary Examiner.*

A. H. SUTTO, *Assistant Examiner.*

U.S. Cl. X.R.

167—22; 260—487, 979

UNITED STATES PATENT OFFICE
CERTIFICATE OF CORRECTION

Patent No. 3,417,165                                      December 17, 1968

Peter E. Newallis et al.

It is certified that error appears in the above identified patent and that said Letters Patent are hereby corrected as shown below:

Column 6, lines 7 to 11, the formula should appear as shown below:

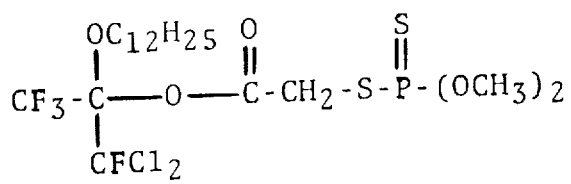

Column 8, TABLE III, third column, line 1 thereof, "82.2" should read -- 85.2 --; same column 8, line 68, before "from" insert -- having --; line 69, before "R$_2$" insert -- and --. Column 9, lines 7 to 10, the formula should appear as shown below:

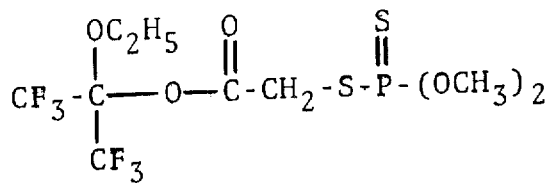

Signed and sealed this 17th day of March 1970.

(SEAL)
Attest:

EDWARD M. FLETCHER, JR.
Attesting Officer

WILLIAM E. SCHUYLER, JR
Commissioner of Patents